US011264702B1

(12) United States Patent
Chieh et al.

(10) Patent No.: US 11,264,702 B1
(45) Date of Patent: Mar. 1, 2022

(54) WIDEBAND PHASED ARRAY ANTENNA MITIGATING EFFECTS OF HOUSING

(71) Applicant: The United States of America as represented by the Secretary of the Navy, San Diego, CA (US)

(72) Inventors: Jia-Chi Samuel Chieh, San Diego, CA (US); Everly S. Yeo, San Diego, CA (US); Randall B. Olsen, Carlsbad, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/070,550

(22) Filed: Oct. 14, 2020

(51) Int. Cl.
| *H04B 1/40* | (2015.01) |
| *H01Q 21/06* | (2006.01) |
| *H01Q 3/30* | (2006.01) |
| *H01Q 9/04* | (2006.01) |
| *H01Q 1/22* | (2006.01) |

(Continued)

(52) U.S. Cl.
CPC ............ *H01Q 1/2283* (2013.01); *H01Q 1/523* (2013.01); *H01Q 3/36* (2013.01); *H01Q 9/0414* (2013.01); *H04B 1/401* (2013.01); *H04B 1/44* (2013.01)

(58) Field of Classification Search
CPC ............ H01Q 1/38; H01Q 1/523; H01Q 3/36; H01Q 21/08; H01Q 9/0414; H01Q 1/52; H01Q 3/30; H01Q 21/06; H01Q 21/065; H01Q 9/04; H04B 1/40; H04B 1/401; H04B 1/44; H04B 7/02
See application file for complete search history.

(56) References Cited

U.S. PATENT DOCUMENTS

| 7,161,537 B2* | 1/2007 | Rafi ................. H01Q 9/0442 343/700 MS |
| 7,333,057 B2 | 2/2008 | Snyder |
| 2004/0150561 A1* | 8/2004 | Tillery ................. H01Q 1/246 343/700 MS |
| 2011/0025574 A1 | 2/2011 | Tiezzi |

(Continued)

OTHER PUBLICATIONS

Wang, Y. et al., "Design of a Wideband Dual-polarized Stacked Patch Antenna with High Isolation and Low Cross Polarization for X-band Applications." 2016 Progress in Electromagnetic Research Symposium (PIERS), pp. 1232-1235. IEEE, 2016.

(Continued)

*Primary Examiner* — Blane J Jackson
(74) *Attorney, Agent, or Firm* — Naval Information Warfare Center, Pacific; Kyle Eppele; James McGee (57) ABSTRACT

A wideband antenna transmits and/or receives electromagnetic radiation. The wideband antenna includes a feedline, a first dielectric layer, a via, a driven patch, a second dielectric layer, and a parasitic patch. The feedline couples a radiofrequency signal and an element of the wideband antenna. The first dielectric layer is between the feedline and the driven patch. The via couples the radiofrequency signal of the feedline through the first dielectric layer. The driven patch couples between the electromagnetic radiation and the radiofrequency signal of the via. The second dielectric layer has a low dielectric constant of less than 1.3. The parasitic patch is electrically isolated from the driven patch by the second dielectric layer between the driven patch and the parasitic patch. The parasitic patch electromagnetically couples with the driven patch and the electromagnetic radiation to produce a wideband frequency response of the wideband antenna.

20 Claims, 5 Drawing Sheets

(51) Int. Cl.
*H04B 1/44* (2006.01)
*H01Q 1/52* (2006.01)
*H01Q 3/36* (2006.01)
*H04B 1/401* (2015.01)

(56) References Cited

U.S. PATENT DOCUMENTS

| | | | | |
|---|---|---|---|---|
| 2015/0236421 | A1* | 8/2015 | Zemliakov | H01Q 9/045 |
| | | | | 343/700 MS |
| 2017/0041038 | A1* | 2/2017 | Kirkpatrick | G01S 7/006 |
| 2019/0020114 | A1* | 1/2019 | Paulotto | H01Q 9/0442 |
| 2019/0020121 | A1* | 1/2019 | Paulotto | H01Q 9/0435 |
| 2019/0115664 | A1* | 4/2019 | Veihl | H01Q 9/0435 |
| 2019/0319364 | A1* | 10/2019 | Yang | H01Q 5/385 |
| 2021/0296773 | A1* | 9/2021 | Baniya | H05K 1/0243 |

OTHER PUBLICATIONS

Targonski, S. D. et al., "Design of Wide-Band Aperture-Stacked Patch Microstrip Antennas." IEEE Transactions on Antennas and Propagation 46, No. 9 (1998) pp. 1245-1251.

Chieh, J. S. et al., "Dual Polarized Ku-Band Phased Array on ROHACELL utilizing Silicon Beamforming Chipsets." 2019 IEEE International Symposium on Phased Array System & Technology (PAST), pp. 1-5. IEEE, Oct. 2019.

Natarajan, A. et al., "A Fully-Integrated 16-Element Phased-Array Receiver in SiGe BiCMOS for 60-GHz Communications." IEEE Journal of Solid-State Circuits 46, No. 5 (2011) pp. 1059-1075.

Shahramian, S. et al., "A 16-element W-Band Phased-Array Transceiver Chipset with Flip-Chip PCB Integrated Antennas for Multi-Gigabit Wireless Data Links." IEEE Transactions on Microwave Theory and Techniques 66, No. 7 (2018) pp. 3389-3402.

Kibaroglu, K. al., "A Low-Cost Scalable 32-Element 28-GHz Phased Array Transceiver for 5G Communication Links Based on a 2 x 2 Beamformer Flip-Chip Unit Cell." IEEE Journal of Solid-State Circuits 53, No. 5 (2018) pp. 1260-1274.

Chieh, J. S. et al., "Ku-Band Dual Polarized Phased Array utilizing Silicon Beamforming Chipsets." 2019 IEEE Topical Workshop on Internet of Space (TWIOS), pp. 1-3. IEEE, 2019.

Rohacell HF, Technical Information. Evonik Industries, 2016.

Vu-Cong, T. et al., "Impact of the nature of the compliant electrodes on the dielectric constant of acrylic and silicone electroactive polymers." Smart Materials and Structures 21, No. 10 (2012) 105036.

* cited by examiner

WIDEBAND PHASED ARRAY ANTENNA MITIGATING EFFECTS OF HOUSING

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 108685.

BACKGROUND OF THE INVENTION

Phased array antennas can be agilely steered electronically. However, phased array antennas suffer from low bandwidth, especially when arranged in a planar array. Non-planar phased array antennas require complex interfacing among the transmitter/receiver electronics, the antenna elements, and the supporting printed circuit boards. Embodiments of the invention provide phased array antennas having a wide bandwidth in a planar configuration without complex interfacing between the transceiver electronics mounted on in a robust configuration on a single printed circuit board having integrated antenna elements.

SUMMARY

A wideband antenna transmits and/or receives electromagnetic radiation. The wideband antenna includes a feedline, a first dielectric layer, a via, a driven patch, a second dielectric layer, and a parasitic patch. The feedline couples a radiofrequency signal and an element of the wideband antenna. The first dielectric layer is between the feedline and the driven patch. The via couples the radiofrequency signal of the feedline through the first dielectric layer. The driven patch couples between the electromagnetic radiation and the radiofrequency signal of the via. The second dielectric layer has a low dielectric constant of less than 1.3. The parasitic patch is electrically isolated from the driven patch by the second dielectric layer between the driven patch and the parasitic patch. The parasitic patch electromagnetically couples with the driven patch and the electromagnetic radiation to produce a wideband frequency response of the wideband antenna.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed antenna systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
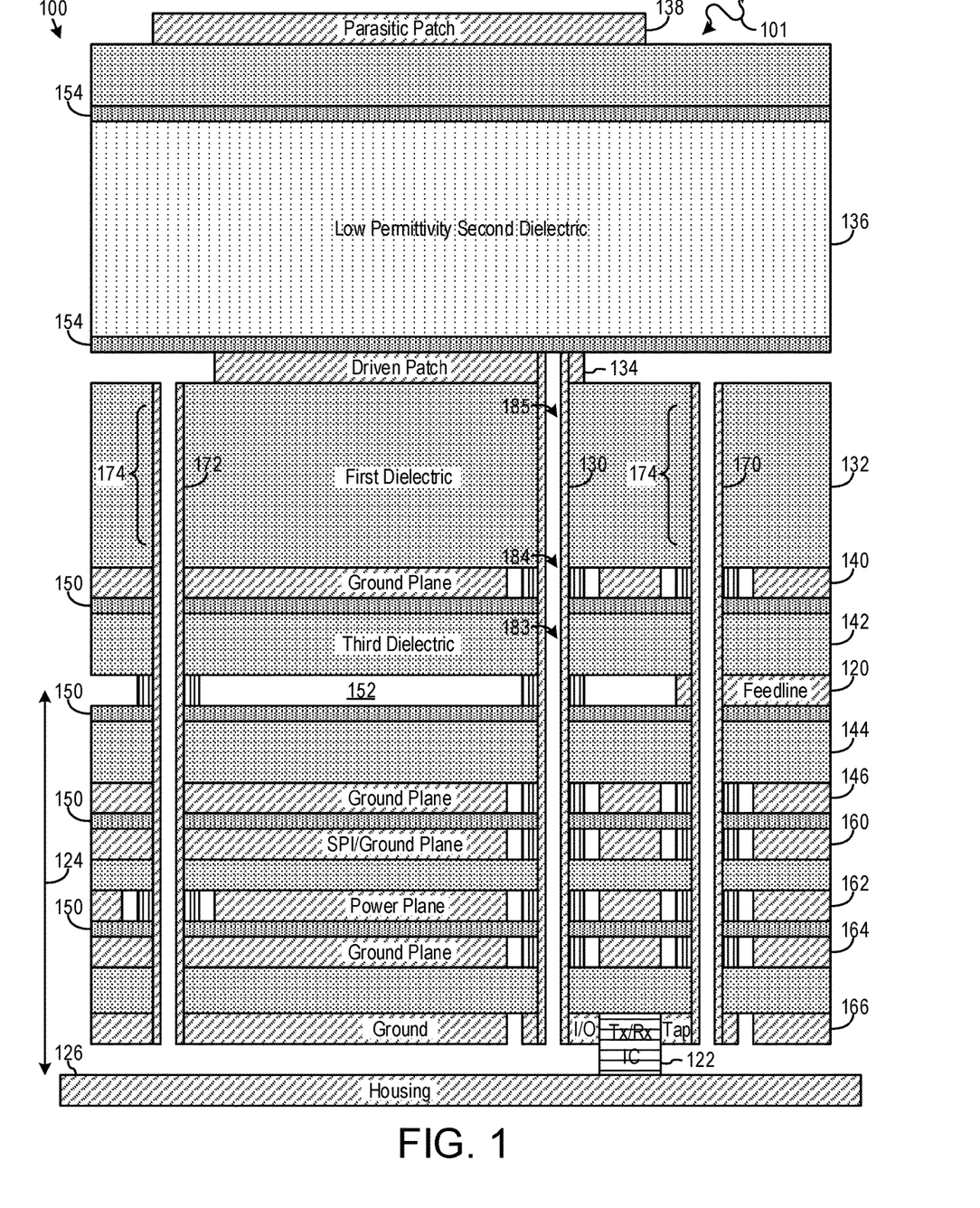
FIG. 1 is a cross-section of a wideband antenna for transmitting and receiving electromagnetic radiation in accordance with an embodiment of the invention.

FIG. 1 is a cross-section of a wideband antenna 100 for transmitting and receiving electromagnetic radiation 101 in accordance with an embodiment of the invention.

The wideband antenna 100 includes a feedline 120 that couples a radiofrequency signal and the element shown of the wideband antenna 100. In this embodiment, feedline 120 terminates at a tap at transceiver integrated circuit 122. During transmitting electromagnetic radiation 101 from wideband antenna 100, transceiver integrated circuit 122 adjusts an amplification amplitude and a phase of the radiofrequency signal from feedline 120, and then transceiver integrated circuit 122 drives the element shown through via 130 with the adjusted radiofrequency signal. During receiving electromagnetic radiation 101 at wideband antenna 100, transceiver integrated circuit 122 adjusts an amplification amplitude and a phase of the radiofrequency signal received from the wideband antenna 100 through via 130, and then transceiver integrated circuit 122 drives the adjusted radiofrequency signal onto feedline 120.

Via 130 couples the radiofrequency signal of the feedline 120 through the first dielectric layer 132 between the feedline 120 and the driven patch 134. Because via 130 directly electrically couples the transceiver integrated circuit 122 and the driven patch 134, there is no electromagnetic coupling between the feedline 120 and the driven patch 134.

The absence of electromagnetic coupling between the feedline 120 and the driven patch 134 makes the coupling between the feedline 120 and the driven patch 134 geometry independent. For example, when the coupling between a feedline and a driven patch instead includes electromagnetic coupling, the electromagnetic coupling is typically strongly dependent upon the spacing 124 between the feedline and the conductive housing. With via 130 electrically coupling the feedline 120 and the driven patch 134 through transceiver integrated circuit 122 without any electromagnetic coupling, the wideband frequency response of the wideband antenna 100 is substantially independent of the spacing 124 between the feedline 120 and the conductive housing 126. Because of this, the positioning of the conductive housing 126 is flexible; for example, the conductive housing 126 is positioned in thermal contact with the transceiver integrated circuit 122 to achieve a compact arrangement with the conductive housing 126 acting as a heat spreader dissipating heat from the transceiver integrated circuit 122.

A parasitic patch 138 is electrically isolated from the driven patch 134 by the second dielectric layer 136 between the driven patch 134 and the parasitic patch 138. The driven patch 134, the parasitic patch 138, and the electromagnetic radiation 101 are all electromagnetically coupled to produce the wideband frequency response of the wideband antenna 100.

Figure 2:
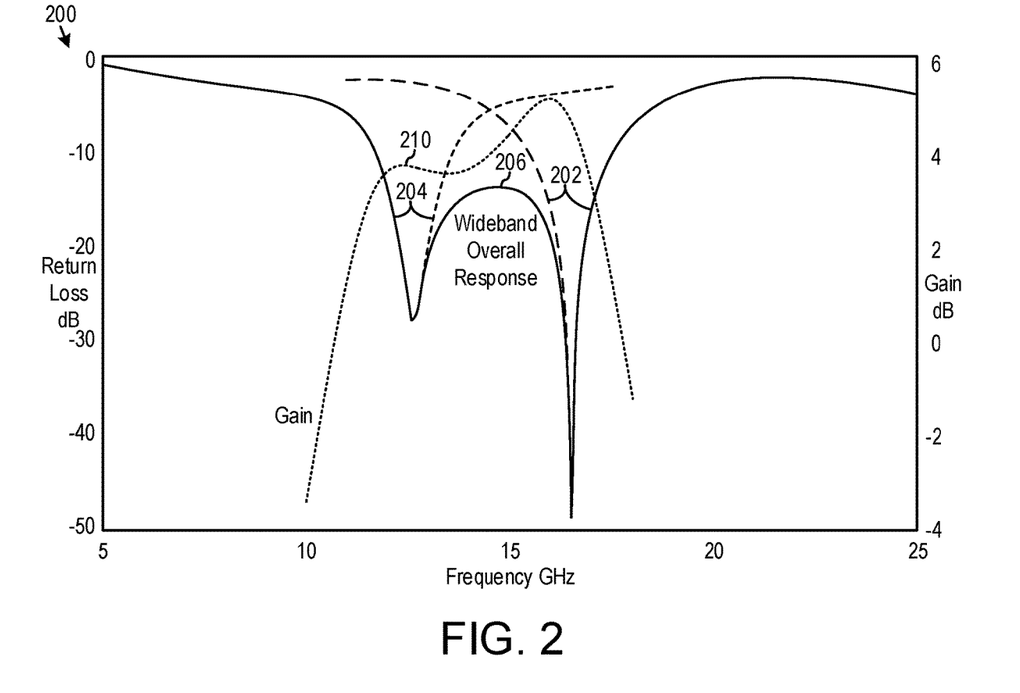
FIG. 2 is a plot of the return loss and gain versus frequency for the wideband antenna of FIG. 1.

Referring to FIG. 2, which shows a plot 200 of the return loss and gain versus frequency of the wideband antenna 100, the driven patch 134 acting alone without the parasitic patch 138 has a resonance response 202. Similarly, the parasitic patch 138 acting alone without the driven patch 134 has a resonance response 204. Because in the embodiment of FIG. 1 the parasitic patch 138 has a larger area than the driven patch 134, the resonance response 204 of the parasitic patch 138 occurs at a lower frequency than the resonance response 202 of the driven patch 134. The areas of the driven patch 134 and the parasitic patch 138 are selected so that the resonance response 202 of the driven patch 134 overlaps the resonance response 204 of the parasitic patch 138, such that the wideband frequency response 206 of the wideband antenna 100 is wider than each of the resonance responses 202 and 204. For example, if the bandwidth is measured at a small return loss of −10 dB, the wideband frequency response 206 of the wideband antenna 100 is about three times wider than each of the resonance responses 202 and 204. Thus, the arrangement of the driven patch 134 and the parasitic patch 138 helps produce the wideband frequency response 206 of the wideband antenna 100 having significant gain 210 throughout the wideband frequency response 206. It will be appreciated that a similar wideband frequency response results from overlapping resonance responses when instead the parasitic patch has a smaller area than the driven patch.

The bandwidth of the wideband frequency response 206 is approximated by the following empirical equation when $\varepsilon_r \gg 1$:

$$BW \propto \frac{\varepsilon_r - 1}{\varepsilon_r^2} \frac{W}{L} h$$

where $\varepsilon_r$ is the dielectric constant of the second dielectric layer 136 between the driven patch 134 and the parasitic patch 138, W and L are the approximate dimensions of the driven patch 134 and the parasitic patch 138, and h is the thickness of the second dielectric layer 136. From the above equation, the bandwidth of the wideband frequency response 206 is approximately inversely proportional to the dielectric constant $\varepsilon_r$ when $\varepsilon_r \gg 1$. Thus, the lower the dielectric constant $\varepsilon_r$, the wider is the bandwidth of the wideband frequency response 206. Applicants have discovered that a lower dielectric constant widens the bandwidth of the wideband frequency response even for an atypically low dielectric constant $\varepsilon_r < 2$ for which the above empirical equation incorrectly predicts a narrowing bandwidth. The lowest possible dielectric constant is $\varepsilon_r = 1$ of air; however, an air dielectric requires the complexity of mechanical standoffs that impact the mechanical robustness of the wideband antenna 100. Embodiments of the invention include the second dielectric layer 136 having a low dielectric constant of less than 1.3, such as an air foam core including the air foam core available as Rohacell providing mechanical robustness with a dielectric constant of close to 1.041 and a loss tangent of 0.0017 at 10 GHz.

In summary, the wideband frequency response 206 of the wideband antenna 100 is achieved by the driven patch 134 and the parasitic patch 138 sized to have overlapping resonance responses 202 and 204, and by the second dielectric layer 136 between patches 134 and 138 that has a low dielectric constant. In addition, the driven patch 134 is electrically, and not electromagnetically, coupled through via 130 to make the wideband frequency response 206 substantially independent of the hence arbitrary spacing 124 between the feedline 120 and the conductive housing 126.

Returning to FIG. 1, wideband antenna 100 further includes a ground plane 140 between the feedline 120 and the driven patch 134. The feedline 120 is between the ground plane 140 and the conductive housing 126. The first dielectric layer 132 is between the ground plane 140 and the driven patch 134. A third dielectric layer 142 is between the feedline 120 and the ground plane 140. Similarly, a fourth dielectric layer 144 is between the feedline 120 and another ground plane 146. Together, the ground planes 140 and 146 and dielectric layers 142 and 144 form a balanced transmission line environment for the feedline 120. In this embodiment, the feedline 120 and third dielectric layer 142 initially constitute a single-sided printed circuit board (PCB) and the ground plane 146 and fourth dielectric layer 144 initially constitute another single-sided PCB so that the feedline 120 has balanced impedance with both the ground planes 140 and 146 when bond-plies 150 adhere these two single-sided PCBs together with other double-sided PCBs.

In the embodiment of FIG. 1, two initially double-sided PCBs are adhered together to provide the SPI/ground plane 160, power plane 162, ground plane 164, and routing layer 166. Vias not shown and routing not shown in routing layer 166 connect appropriate pins of the transceiver integrated circuit 122 to ground of ground plane 164, power from power plane 162, and a Serial Protocol Interface (SPI) of SPI/ground plane 160. A controller (not shown) uses the Serial Protocol Interface to select between transmit and receive modes of the transceiver integrated circuit 122, and to assign the amplification amplitude and phase that the transceiver integrated circuit 122 imparts to the radiofrequency signal.

At an intermediate stage of manufacture of the wideband antenna 100, the four bond-plies 150 adhere together two single-sided PCBs and three double-sided PCBs encompassing the conductive layers of driven patch 134, ground plane 140, feedline 120, ground plane 146, SPI/ground plane 160, power plane 162, ground plane 164, and routing layer 166. For clarity, the thickness of these conductive layers are exaggerated, and also gaps, such as gap 152, are shown in these conductive layers; however, bond-plies 150 fill these gaps. In one embodiment the bond-plies 150 are Rogers 4450B bonding together initially separate PCBs each having a core of Rogers 4350B.

After the four bond-plies 150 adhere together the five original PCBs in the intermediate assembly, holes are drilled through the various layers of the intermediate assembly and the insides of these holes are electroplated with a conductive plating to form vias, which include feedline via 170, signal via 130, and ground via 172. This approach has the advantage that a single electroplating operation produces all the vias needed in the wideband antenna 100. These vias become blind vias upon final assembly of the wideband antenna 100 because these vias do not extend above the driven patch 134. The feedline via 130 couples the radiofrequency signal of the feedline 120 through layers including the third dielectric layer 142, the ground plane 140, and the first dielectric layer 132. To maintain the continuity of the ground plane 140 for the driven patch 134, the portions 174 of the conductive plating inside within the first dielectric layer 132 are removed by back-drilling the vias besides signal via 130 in this embodiment. The feedline via 170 is back-drilled further down to, but not into, the feedline 120 in this embodiment.

A final single-sided PCB supports the parasitic patch 138. The final assembly of the wideband antenna 100 uses two bond-plies 154 to adhere together the intermediate assembly discussed above, the second dielectric layer 136, and the PCB with the parasitic patch 138. To achieve a low dielectric constant, the second dielectric layer 136 is an air foam core including more than 90% void space, such as a 40 mils thickness of Rohacell HF. Because Rohacell might degrade upon exposure to humidity, the two bond-plies 154 are cured not only to adhere the Rohacell to the driven patch 134 and the parasitic patch 138, but also to hermetically seal the Rohacell of the second dielectric layer 136 between the two bond-plies 154. In certain embodiments, the bond-plies 154 are Arlon Prepreg 5250 Bondply or a cured liquid crystal polymer.

Figure 3:
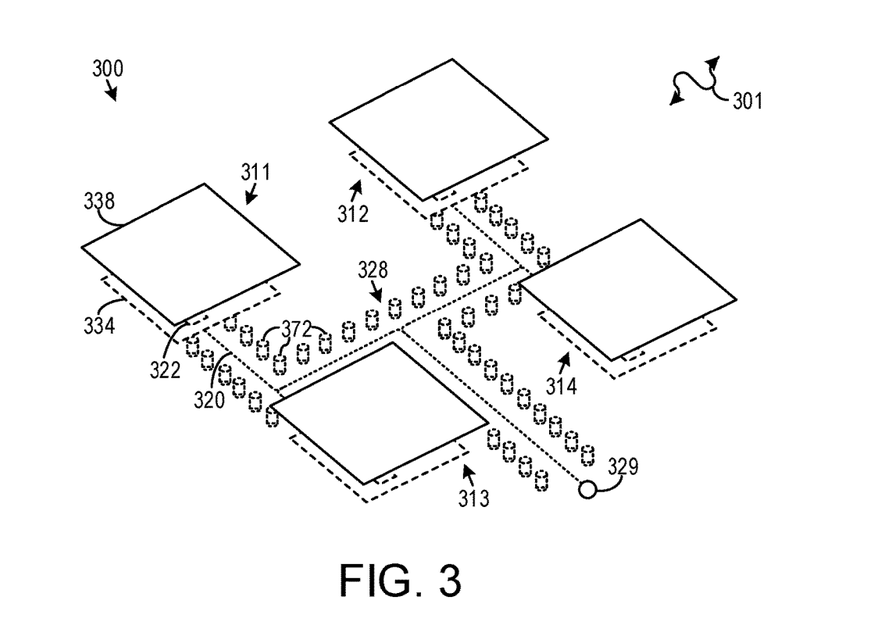
FIG. 3 is a perspective view of a wideband phased array antenna for transmitting and receiving electromagnetic radiation in accordance with an embodiment of the invention.

FIG. 3 is a perspective view of a wideband phased array antenna 300 for transmitting and receiving electromagnetic radiation 301 in accordance with an embodiment of the invention. The wideband phased array antenna 300 includes elements 311, 312, 313, and 314 arranged in a planar array having rows and columns with an equal pitch between the elements within the rows and the equal pitch between the elements within the columns. In will be appreciated that typically a wideband phased array antenna has more than the four elements shown in FIG. 3. For example, a prototype of a wideband phased array antenna was implemented with 64 elements in a planar array with eight rows and eight columns.

Each of the elements 311, 312, 313, and 314 is similar to the element shown in FIG. 1. Thus, each of the elements 311, 312, 313, and 314 includes a respective instance of the feedline 120, the via 130, the driven patch 134, and the parasitic patch 138 of FIG. 1. Each of the elements 311, 312, 313, and 314 also share the first dielectric layer 132 and second dielectric layer 136. For example, element 311 includes a feedline 320 for coupling a radiofrequency signal and the element 311 of the wideband phased array antenna. Element 311 includes a driven patch 334 and a parasitic patch 338. A first dielectric layer (not shown) is between the feedline 320 and the driven patch 334, and a signal via (not shown) couples a radiofrequency signal of the feedline 320 through the first dielectric layer via the transceiver integrated circuit 322.

The parasitic patch 338 is electrically isolated from the driven patch 334 by the second dielectric layer (not shown) between the driven patch 334 and the parasitic patch 338. The second dielectric layer has a low dielectric constant of less than 1.3. The parasitic patch 338 and the driven patch 334 are electromagnetically coupled and they electromagnetically couple between the electromagnetic radiation 301 and the radiofrequency signal of the signal via (not shown), thereby producing a wideband frequency response of the wideband phased array antenna 300.

A splitter/combiner network 328 couples an aggregate radiofrequency signal at a radiofrequency interface 329 with respective taps for the transceiver integrated circuits, including the transceiver integrated circuit 322. During a transmit mode, the splitter/combiner network 328 splits the aggregate radiofrequency signal among the respective taps for transmitting the electromagnetic radiation 301 toward a direction of an antenna beam of the wideband phased array antenna 300. During a receive mode, the splitter/combiner network 328 from the respective taps combines the aggregate radiofrequency signal for receiving the electromagnetic radiation 301 from the direction of the antenna beam.

The feedlines including feedline 320 of the splitter/combiner network 328 are flanked by ground vias 372. Each of ground vias 372 is similar to ground via 172 of FIG. 1. Ground vias 372 couple ground planes above and below the splitter/combiner network 328 to form a grounded cage around the feedlines of the splitter/combiner network 328. As shown, the ground vias 372 are back-drilled to remove their portions within the first dielectric layer (not shown) between the feedline 320 and the driven patch 334.

Referring back to FIG. 1, a first layer forms at least part of the conductive housing 126 for each element of the wideband antenna 100, such as elements 311, 312, 313, and 314 of the wideband phased array antenna 300 of FIG. 3. A second layer is conductive and is patterned to include the feedline 120 for each of the elements. In one embodiment, the second layer also includes embedded thin film resistors that balance the impedance at the branches of splitter/combiner network 328 that is a Wilkinson splitter/combiner. The wideband frequency response is substantially independent of a spacing 124 between the first layer of conductive housing 126 and the second layer of feedline 120.

A third layer forms a third dielectric 142 and the third layer is patterned with a respective hole 183 for each of the elements. The second layer of feedline 120 is between the first layer of conductive housing 126 and the third layer of third dielectric 142. A fourth layer forms a ground plane 140 patterned with a respective hole 184 for each of the elements. The third layer of third dielectric 142 is between the second layer of feedline 120 and the fourth layer of ground plane 140. A fifth layer forms the first dielectric 132 for each of the elements, and the fifth layer is patterned with a respective hole 185 for each of the elements. The fourth layer of ground plane 140 is between the third layer of third dielectric 142 and the fifth layer of first dielectric 132.

A sixth layer is conductive and is patterned to include the driven patch 134 for each of the elements. A seventh layer forms the second dielectric 136 for each of the elements. An eighth layer is conductive and is patterned to include the parasitic patch 138 for each of the elements.

The via 130 for each the elements includes a conductive plating inside the holes 183, 184, and 185 through the third, fourth, and fifth layers, respectively. The via 130 of each of the elements is a blind via extending at least between the feedline 120 in the second layer and the driven patch 134 in the sixth layer, but not extending into the second dielectric 136 of the seventh layer and the parasitic patch 138 of the eighth layer.

Figure 4:
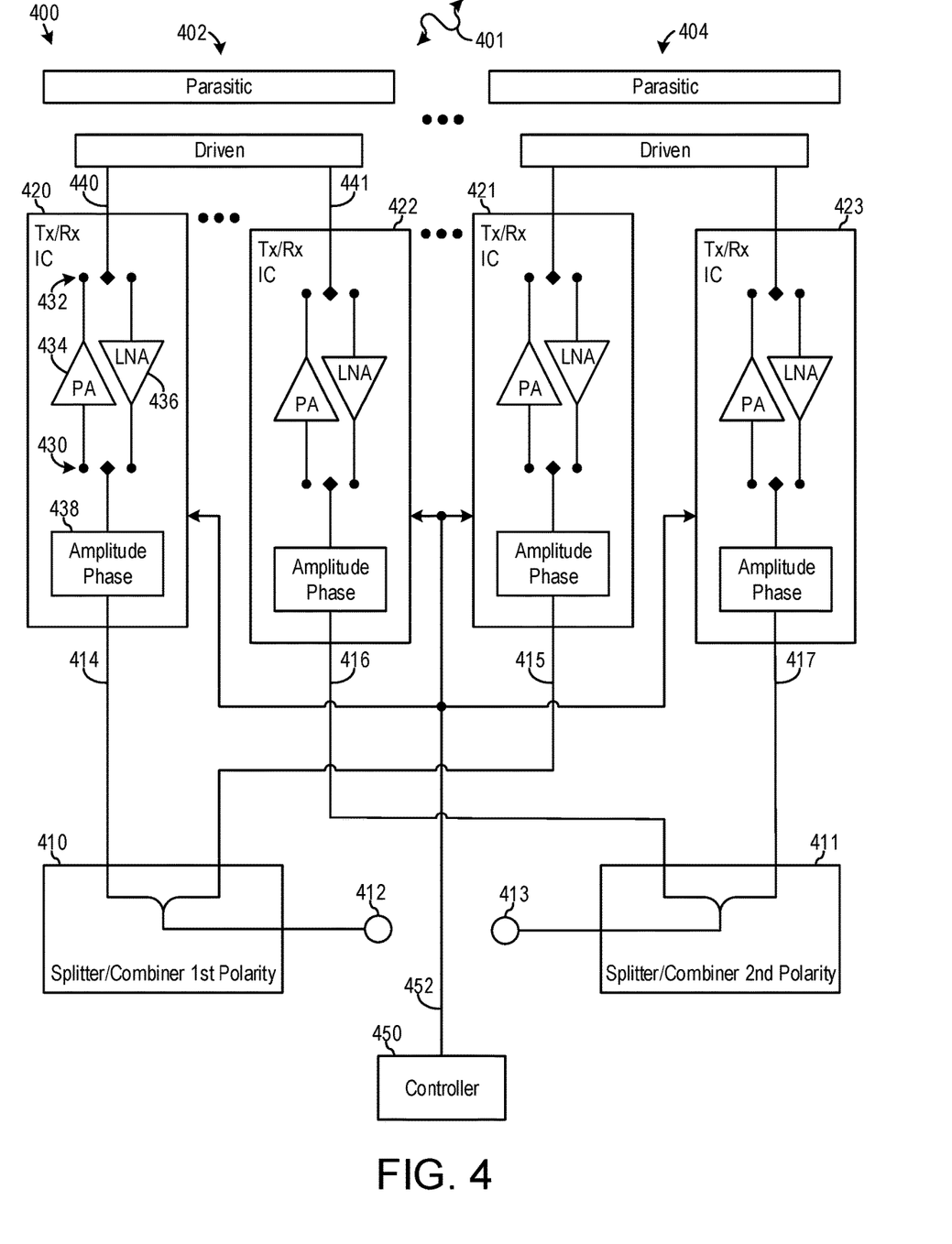
FIG. 4 is a block diagram of a wideband phased array antenna for transmitting and receiving electromagnetic radiation in accordance with an embodiment of the invention.

FIG. 4 is a block diagram of a wideband phased array antenna 400 for transmitting and receiving electromagnetic radiation 401 in accordance with an embodiment of the invention. The wideband phased array antenna 400 includes elements 402 through 404 and supports transmitting and receiving electromagnetic radiation 401 having orthogonal polarizations, such as linear vertical and linear horizontal polarizations, or right circular polarization and left circular polarization.

A splitter/combiner network 410 for one polarization couples a radiofrequency interface 412 with respective taps 414 through 415 for transceiver integrated circuits 420 through 421. Another splitter/combiner network 411 for the other orthogonal polarization couples a radiofrequency interface 413 with respective taps 416 through 417 for transceiver integrated circuits 422 through 423. The aggregate radiofrequency signal has orthogonal polarizations that are either related or independent at radiofrequency interfaces 412 and 413.

During the transmit mode, the splitter/combiner network 410 splits an aggregate radiofrequency signal at a radiofrequency interface 412 among the respective taps 414 through 415 for transmitting one polarization of the electromagnetic radiation 401 toward the direction of the antenna beam of the wideband phased array antenna 400. During the receive mode, the splitter/combiner network 410 from the respective taps 414 through 415 combines the aggregate radiofrequency signal at a radiofrequency interface 412 for receiving one polarization of the electromagnetic radiation 401 from the direction of the antenna beam. The splitter/combiner network 411 for the other orthogonal polarization operates similarly.

The transceiver integrated circuit 420 includes a switch including a first pole 430 and a second pole 432, a power amplifier 434, a low-noise amplifier 436, and a signal adjuster 438. During the transmit mode, pole 430 of the switch couples the respective tap 414 of the splitter/combiner network 410 to an input of the power amplifier 434 via the signal adjuster 438, and pole 432 of the switch couples an output of the power amplifier 434 to the radiofrequency signal coupled to the feedline 440 for the element 402. During the receive mode, pole 432 of the switch couples the radiofrequency signal coupled to the feedline 440 for the element 402 to an input of the low-noise amplifier 436, and pole 430 of the switch couples an output of the low-noise amplifier 436 to the respective tap 414 of the splitter/combiner network 410 via the signal adjuster 438. The transceiver integrated circuit 422 similarly couples respective tap 416 of the splitter/combiner network 411 and the feedline 441 for the element 402 for transmitting and receiving an orthogonal polarization.

The wideband phased array antenna 400 includes a controller 450. The controller 450 selects between a transmit mode and a receive mode of the wideband phased array antenna 400 by controlling the poles 430 and 432 of the switch of transceiver integrated circuit 420, and by controlling similar switches of transceiver integrated circuits 421 and 422 through 423. The controller 450 adjusts an amplification amplitude and a phase of the radiofrequency signal coupled to the feedlines 440 and 441 of element 402 and similarly for other elements by controlling the signal adjuster 438 of transceiver integrated circuit 420, and by controlling similar signal adjusters of transceiver integrated circuits 421 and 422 through 423. Although a parallel connection 452 is shown between controller 450 and the transceiver integrated circuits 420 through 421 and 422 through 423, the connection 452 is instead a Serial Protocol Interface (SPI) daisy-chained through the transceiver integrated circuits 420 through 421 and 422 through 423 in one embodiment.

For example, the controller 450 adjusts the amplification amplitude and a phase for each of the elements 402 through 404 to electronically steer a direction of an antenna beam for transmitting and receiving the electromagnetic radiation 401, including setting the phase at each of the elements 402 through 404 to match an instantaneous phase of a plane wave propagating towards or from the direction, and setting the amplification amplitude of those elements along the perimeter of the wideband phased array antenna 400 to less than the maximum amplification to diminish the side lobes around the antenna beam of the wideband phased array antenna 400. Thus, controller 450 adjusts the transceiver integrated circuits 420 through 421 and 422 through 423 so that collectively these transceiver integrated circuits elements are adapted to electronically steer the direction of the antenna beam for transmitting and receiving the electromagnetic radiation 401.

Figure 5:
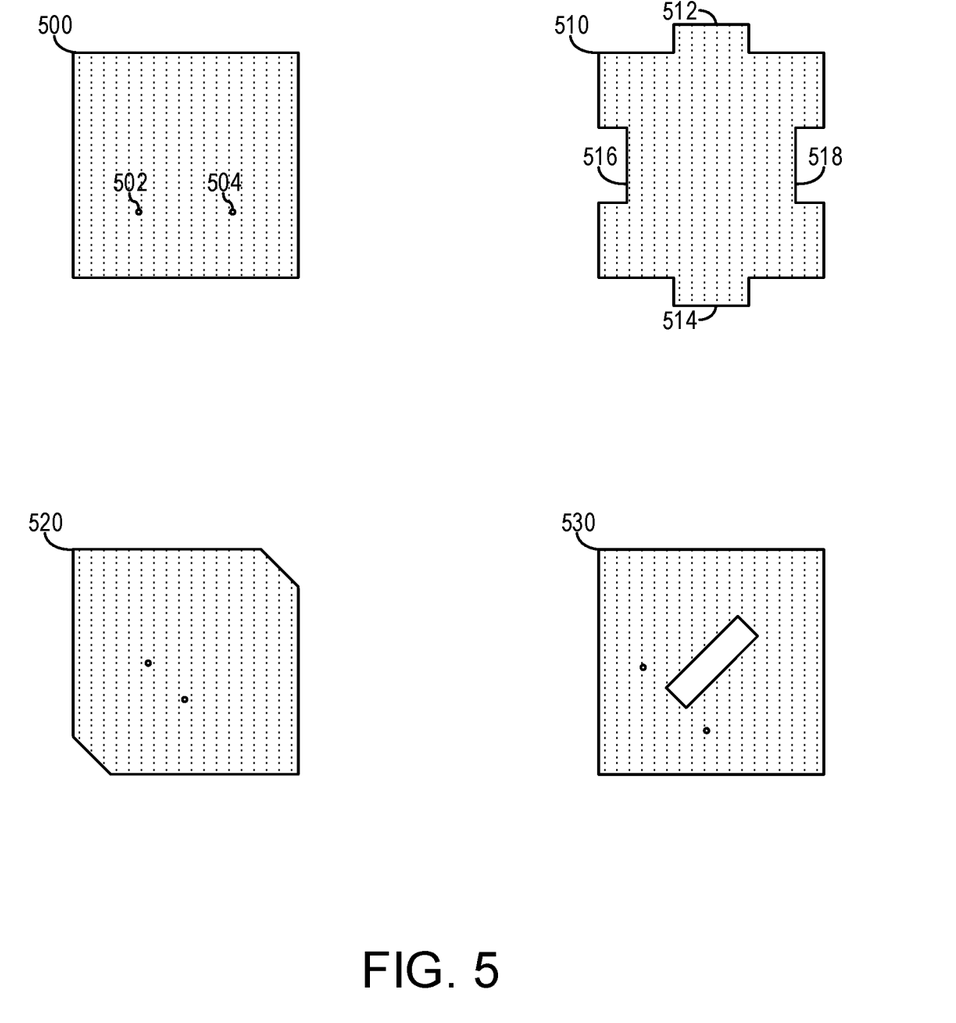
FIG. 5 is a plan view of various patches for elements of a wideband phased array antenna for transmitting and receiving electromagnetic radiation in accordance with embodiments of the invention.

FIG. 5 is a plan view of various patches 500, 510, 520, and 530 for elements of a wideband phased array antenna for transmitting and receiving electromagnetic radiation in accordance with embodiments of the invention.

Each of the driven patch 134 and parasitic patch 138 of FIG. 1 has any one of the four shapes shown in FIG. 5 for patches 500, 510, 520, and 530. Patches 500, 520, and 530 show dual via locations, and orthogonal polarizations are independently transmitted and received when appropriate radiofrequency signals are optionally coupled to both via locations. For example, the embodiment of FIG. 3 has the rectangular shape of patch 500 for both the driven patch 334 and the parasitic patch 338; the embodiment of FIG. 3 is extended to transmit and receive orthogonal linear polarizations when the first via 502 of patch 500 for driven patch 334 is coupled to a radiofrequency signal of feedline, such as feedline 440 of FIG. 4, for one linear polarization, and the second via 504 is coupled to an independent radiofrequency signal of a feedline, such as feedline 441, for the orthogonal linear polarization.

Patches 510, 520, and 530 have respective shapes that induce at least some circular current flow so that the wideband phased array antenna radiates at least partially circular polarization when any of these patches are used for either the driven patch or the parasitic patch. For example, when the driven patch of patch 500 is paired with the parasitic patch of patch 510, the two tabs 512 and 514 and the two notches 516 and 518 of the parasitic patch induce circular currents so that the wideband phased array antenna radiates left circular polarization and/or right circular polarization. The wideband phased array antenna radiates only left circular polarization when only via 502 is used in the driven patch. If instead only via 504 is used in the driven patch, then the wideband phased array antenna radiates only right circular polarization. If independent radiofrequency signals are coupled to both vias 502 and 504 of patch 500 for the driven patch, then simultaneously the wideband phased array antenna radiates independent left and right circular polarizations.

Figure 6:
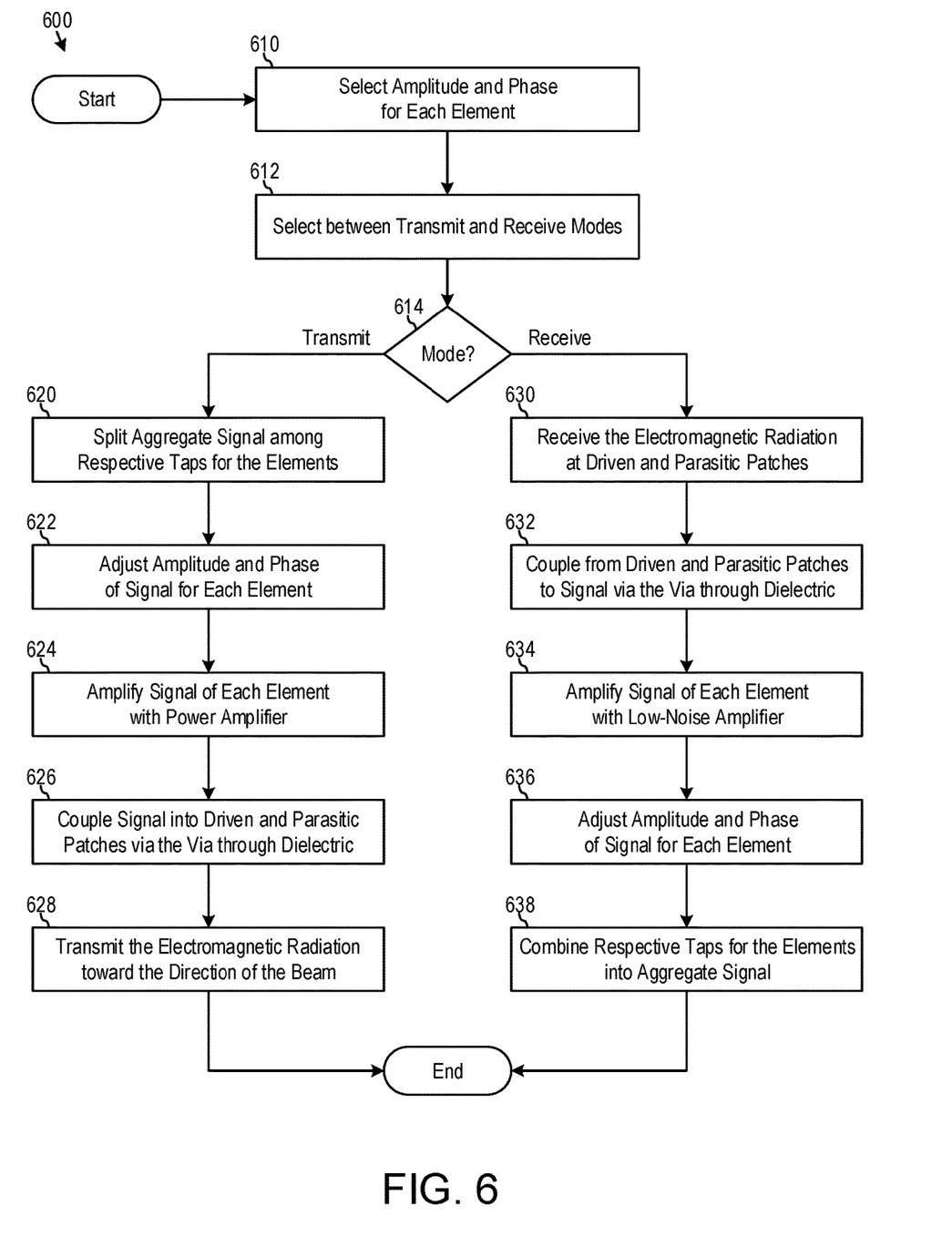
FIG. 6 is a flow diagram of process for transmitting and receiving electromagnetic radiation with a wideband phased array antenna in accordance with an embodiment of the invention.

FIG. 6 is a flow diagram of process 600 for transmitting and receiving electromagnetic radiation with a wideband phased array antenna in accordance with an embodiment of the invention.

At step 610, a controller selects an amplification amplitude and a phase for each element of the wideband phased array antenna. For example, the phase of each element is selected to match an instantaneous phase at the element of a plane wave propagating towards or from the direction of a synthesized antenna beam of the wideband phased array antenna, and the amplification amplitude of those elements along the perimeter of the wideband phased array antenna is set to a lessor amplification to diminish the side lobes around the antenna beam. The amplification amplitude and phase of the radiofrequency signal coupled to the feedline of each of the elements are selected for electronically steering the direction of the antenna beam for transmitting and receiving the electromagnetic radiation.

At step 612, the controller selects between transmit and receive modes of the wideband phased array antenna. For example, the amplification amplitude and the phase of each of the elements is maintained constant while the wideband phased array antenna alternates in half duplex between transmitting and receiving in the direction of the antenna beam specified by the amplification amplitude and the phase of each of the elements. Decision 614 checks the current mode and process 600 proceeds to step 620 for transmit mode and step 630 for receive mode.

During the transmit mode, at step 620 a splitter/combiner network splits an aggregate radiofrequency signal from a radiofrequency interface among respective taps for the elements. At step 622, transceiver integrated circuits adjust the amplification amplitude and the phase selected at step 610 for the radiofrequency signal coupled to the feedline of the respective tap for each element. At step 624, a power amplifier in each transceiver integrated circuit amplifies the adjusted radiofrequency signal. At step 626, the adjusted and amplified radiofrequency signal of each element is electrically coupled from the feedline of the element into the driven patch via the via through the first dielectric, and then farther electromagnetically coupled into the parasitic patch of the element. At step 628, the wideband phased array antenna transmits the electromagnetic radiation from the driven and parasitic patches of the elements toward the direction of the antenna beam.

During the receive mode, at step 630 the driven and parasitic patches of the elements receive the electromagnetic radiation. At step 632, the electromagnetic radiation is coupled from the driven and parasitic patches of each element into the radiofrequency signal coupled to the feedline of the element via the via through the first dielectric. At step 634, a low-noise amplifier in each transceiver integrated circuit amplifies the radiofrequency signal. At step 636, transceiver integrated circuits adjust the amplification amplitude and the phase selected at step 610 for the radiofrequency signal at the respective tap for each element. At step 638, a splitter/combiner network combines the respective taps for the elements into the aggregate radiofrequency signal at the radiofrequency interface. The aggregate radiofrequency signal represents the electromagnetic radiation received from the direction of the antenna beam.

From the above description of the Wideband Phased Array Antenna Mitigating Effects of Housing, it is manifest that various techniques may be used for implementing the concepts of the systems of wideband phased array antenna 300 and 400 and method of process 600 without departing from the scope of the claims. The described embodiments are to be considered in all respects as illustrative and not restrictive. The systems/methods disclosed herein may be practiced in the absence of any element that is not specifically claimed and/or disclosed herein. It should also be understood that systems of 300 and 400 and method of 600 are not limited to the particular embodiments described herein, but are capable of many embodiments without departing from the scope of the claims.

We claim:

1. A wideband antenna for transmitting and/or receiving electromagnetic radiation, comprising:
   a feedline for coupling a radiofrequency signal and an element of the wideband antenna;
   a first dielectric layer;
   a via for coupling the radiofrequency signal of the feedline through the first dielectric layer;
   a driven patch for coupling between the electromagnetic radiation and the radiofrequency signal of the via, wherein the first dielectric layer is between the feedline and the driven patch;
   a second dielectric layer, the second dielectric layer having a low dielectric constant of less than 1.3;
   a parasitic patch electrically isolated from the driven patch by the second dielectric layer between the driven patch and the parasitic patch, the parasitic patch for electromagnetically coupling with the driven patch and the electromagnetic radiation to produce a wideband frequency response of the wideband antenna;
   a ground plane between the feedline and the driven patch, wherein the first dielectric layer is between the ground plane and the driven patch;
   a third dielectric layer between the feedline and the ground plane, wherein the via couples the feedline and the driven patch for coupling the radiofrequency signal of the feedline through the third dielectric layer, the ground plane, and the first dielectric layer; and
   a conductive housing, wherein the feedline is between the ground plane and the conductive housing, and the wideband frequency response is substantially independent of a spacing between the conductive housing and the feedline.

2. The wideband antenna of claim 1, wherein the driven patch has a first area with a first resonance response and the parasitic patch has a second area with a second resonance response, the second area larger than the first area and the first and second resonance responses overlapping, such that the wideband frequency response of the wideband antenna is wider than each of the first and second resonance responses.

3. The wideband antenna of claim 1, wherein the driven patch has a first area with a first resonance response and the parasitic patch has a second area with a second resonance response, the second area different than the first area and the first and second resonance responses overlapping, such that the wideband frequency response of the wideband antenna is wider than each of the first and second resonance responses.

4. The wideband antenna of claim 1, wherein the element is one of a plurality of elements of the wideband antenna that is a wideband phased array antenna for transmitting and/or receiving the electromagnetic radiation, each of the elements including a respective instance of the feedline, the via, the driven patch, and the parasitic patch, and each of the elements sharing the first and second dielectric layers.

5. A wideband phased array antenna for transmitting and/or receiving electromagnetic radiation, the wideband phased array antenna comprising a plurality of elements, each element of the elements comprising:
   a feedline for coupling a radiofrequency signal and the element of the wideband phased array antenna;
   a first dielectric;
   a via for coupling the radiofrequency signal of the feedline through the first dielectric;
   a driven patch for coupling between the electromagnetic radiation and the radiofrequency signal of the via, wherein the first dielectric is between the feedline and the driven patch;
   a second dielectric, the second dielectric having a low dielectric constant of less than 1.3;
   a parasitic patch electrically isolated from the driven patch by the second dielectric between the driven patch and the parasitic patch, the parasitic patch for electromagnetically coupling with the driven patch and the electromagnetic radiation to produce a wideband frequency response of the wideband phased array antenna; and
   a respective one of a plurality of transceiver integrated circuits, the respective transceiver integrated circuit coupled to the feedline of the element and adapted to adjust an amplitude and a phase of the radiofrequency signal coupled to the feedline, thereby collectively the transceiver integrated circuits elements are adapted to electronically steer a direction of an antenna beam for transmitting and receiving the electromagnetic radiation;

and wherein the wideband phased array antenna has a transmit mode and a receive mode, and the wideband phased array antenna further comprises:

a radiofrequency interface for coupling an aggregate radiofrequency signal; and a splitter/combiner network coupling the radiofrequency interface with respective taps for the transceiver integrated circuits, wherein, during the transmit mode, the splitter/combiner network splits the aggregate radiofrequency signal among the respective taps for transmitting the electromagnetic radiation toward the direction of the antenna beam, and wherein, during the receive mode, the splitter/combiner network from the respective taps combines the aggregate radiofrequency signal for receiving the electromagnetic radiation from the direction of the antenna beam.

6. The wideband phased array antenna of claim 5, wherein the elements of the wideband phased array antenna are arranged in a planar array having rows and columns with an equal pitch between the elements within the rows and the equal pitch between the elements within the columns.

7. The wideband phased array antenna of claim 5, further comprising a controller, wherein the controller is adapted to:

adjust the amplitude and the phase of the radiofrequency signal coupled to the feedline of each of the elements for electronically steering the direction of the antenna beam for transmitting and receiving the electromagnetic radiation; and select between the transmit mode and the receive mode of the wideband phased array antenna, wherein, during the transmit mode, the wideband phased array antenna transmits the electromagnetic radiation toward the direction of the antenna beam, and, during the receive mode, the wideband phased array antenna receives the electromagnetic radiation from the direction of the antenna beam.

8. The wideband phased array antenna of claim 5, wherein the respective transceiver integrated circuit for each element of the elements includes a switch, a low-noise amplifier, and a power amplifier, and, during the transmit mode, the switch couples the respective tap of the splitter/combiner network to an input of the power amplifier and couples an output of the power amplifier to the radiofrequency signal coupled to the feedline for the element, and during the receive mode, the switch couples the radiofrequency signal coupled to the feedline for the element to an input of the low-noise amplifier and couples an output of the low-noise amplifier to the respective tap of the splitter/combiner network.

9. The wideband phased array antenna of claim 5, wherein a layer forms the first dielectric for each of the elements, wherein the layer includes:

an air foam core including more than 90% void space;

a first layer cured to adhere the air foam core to the driven patch for each of the elements; and a second layer cured to adhere the air foam core to the parasitic patch for each of the elements.

10. The wideband phased array antenna of claim 9, wherein the air foam core is a 40 mils thickness of Rohacell and the first and second layers hermetically seal the Rohacell.

11. The wideband phased array antenna of claim 5, wherein:

a first layer is conductive and is patterned to include the feedline for each of the elements;

a second layer forms the first dielectric for each of the elements, wherein the second layer is patterned with a respective hole for each of the elements, and the via for each one of the elements includes a conductive plating inside the respective hole for the one of the elements;

a third layer is conductive and is patterned to include the driven patch for each of the elements;

a fourth layer forms the second dielectric for each of the elements; and a fifth layer is conductive and is patterned to include the parasitic patch for each of the elements.

12. The wideband phased array antenna of claim 5, comprising:

a first layer forming at least part of a conductive housing for the elements of the wideband phased array antenna;

a second layer that is conductive and is patterned to include the feedline for each of the elements, wherein the wideband frequency response is substantially independent of a spacing between the first layer and the second layer;

a third layer forming a third dielectric, wherein the second layer is between the first layer and the third layer, and the third layer is patterned with a respective hole for each of the elements;

a fourth layer forming a ground plane, wherein the third layer is between the second layer and the fourth layer, and the fourth layer is patterned with a respective hole for each of the elements;

a fifth layer forming the first dielectric for each of the elements, wherein the fourth layer is between the third layer and the fifth layer, and the fifth layer is patterned with a respective hole for each of the elements, and wherein the via for each one of the elements includes a conductive plating inside the respective hole through each of the third, fourth, and fifth layers for the one of the elements;

a sixth layer that is conductive and is patterned to include the driven patch for each of the elements;

a seventh layer forming the second dielectric for each of the elements; and an eighth layer that is conductive and is patterned to include the parasitic patch for each of the elements.

13. The wideband phased array antenna of claim 12, wherein the via of each of the elements is a blind via extending between the feedline in the second layer and the driven patch in the sixth layer, but not extending into the seventh and eighth layers.

14. A wideband phased array antenna for transmitting and/or receiving electromagnetic radiation, the wideband phased array antenna comprising a plurality of elements, each element of the elements comprising:

a first feedline for coupling a first radiofrequency signal and the element of the wideband phased array antenna;

a first dielectric;

a first via for coupling the first radiofrequency signal of the first feedline through the first dielectric;

a driven patch for coupling between the electromagnetic radiation and the first radiofrequency signal of the first via, wherein the first dielectric is between the first feedline and the driven patch;

a second dielectric, the second dielectric having a low dielectric constant of less than 1.3;

a parasitic patch electrically isolated from the driven patch by the second dielectric between the driven patch and the parasitic patch, the parasitic patch for electromagnetically coupling with the driven patch and the electromagnetic radiation to produce a wideband frequency response of the wideband phased array antenna;
a second feedline for coupling a second radiofrequency signal and the element of the wideband phased array antenna; and
a second via for coupling the second radiofrequency signal of the second feedline through the first dielectric to the driven patch,
wherein, in response to the first radiofrequency signal, the driven and parasitic patches of the elements radiate the electromagnetic radiation having a first polarization, and, in response to the second radiofrequency signal, the driven and parasitic patches of the elements radiate the electromagnetic radiation having a second polarization that is orthogonal to the first polarization.

15. The wideband phased array antenna of claim 14, wherein the parasitic patch of each of the elements has at least two tabs and at least two notches, and wherein the first polarization is right circular polarization and the second polarization is left circular polarization.

16. The wideband phased array antenna of claim 14, further comprising a controller, wherein the controller is adapted to:
adjust an amplitude and a phase of the first radiofrequency signal coupled to the first feedline of each of the elements for electronically steering a direction of an antenna beam for transmitting and receiving the electromagnetic radiation; and
select between a transmit mode and a receive mode of the wideband phased array antenna, wherein, during the transmit mode, the wideband phased array antenna transmits the electromagnetic radiation toward the direction of the antenna beam, and, during the receive mode, the wideband phased array antenna receives the electromagnetic radiation from the direction of the antenna beam.

17. The wideband phased array antenna of claim 14, wherein each element of the elements further comprises:
a respective one of a plurality of transceiver integrated circuits, the respective transceiver integrated circuit coupled to the first feedline of the element and adapted to adjust an amplitude and a phase of the first radiofrequency signal coupled to the first feedline, thereby collectively the transceiver integrated circuits elements are adapted to electronically steer a direction of an antenna beam for transmitting and receiving the electromagnetic radiation;
and wherein the wideband phased array antenna has a transmit mode and a receive mode, and the wideband phased array antenna further comprises:
a radiofrequency interface for coupling an aggregate radiofrequency signal; and
a splitter/combiner network coupling the radiofrequency interface with respective taps for the transceiver integrated circuits, wherein, during the transmit mode, the splitter/combiner network splits the aggregate radiofrequency signal among the respective taps for transmitting the electromagnetic radiation toward the direction of the antenna beam, and wherein, during the receive mode, the splitter/combiner network from the respective taps combines the aggregate radiofrequency signal for receiving the electromagnetic radiation from the direction of the antenna beam.

18. The wideband phased array antenna of claim 17, wherein the respective transceiver integrated circuit for each element of the elements includes a switch, a low-noise amplifier, and a power amplifier, and, during the transmit mode, the switch couples the respective tap of the splitter/combiner network to an input of the power amplifier and couples an output of the power amplifier to the first radiofrequency signal coupled to the first feedline for the element, and during the receive mode, the switch couples the first radiofrequency signal coupled to the first feedline for the element to an input of the low-noise amplifier and couples an output of the low-noise amplifier to the respective tap of the splitter/combiner network.

19. The wideband phased array antenna of claim 14, wherein a layer forms the first dielectric for each of the elements, wherein the layer includes:
an air foam core including more than 90% void space;
a first layer cured to adhere the air foam core to the driven patch for each of the elements; and
a second layer cured to adhere the air foam core to the parasitic patch for each of the elements.

20. A method for transmitting and receiving electromagnetic radiation with a wideband phased array antenna, for transmitting and/or receiving the electromagnetic radiation, the wideband phased array antenna comprising a plurality of elements,
each element of the elements comprising:
a feedline for coupling a radiofrequency signal and the element of the wideband phased array antenna;
a first dielectric;
a via for coupling the radiofrequency signal of the feedline through the first dielectric;
a driven patch for coupling between the electromagnetic radiation and the radiofrequency signal of the via, wherein the first dielectric is between the feedline and the driven patch;
a second dielectric, the second dielectric having a low dielectric constant of less than 1.3; and
a parasitic patch electrically isolated from the driven patch by the second dielectric between the driven patch and the parasitic patch, the parasitic patch for electromagnetically coupling with the driven patch and the electromagnetic radiation to produce a wideband frequency response of the wideband phased array antenna,
the method comprising:
selecting an amplitude and a phase of the radiofrequency signal coupled to the feedline of each of the elements for electronically steering a direction of an antenna beam for transmitting and receiving the electromagnetic radiation;
selecting one of a transmit mode and a receive mode of the wideband phased array antenna;
during the transmit mode:
splitting an aggregate radiofrequency signal from a radiofrequency interface among respective taps for the elements, the respective taps including a respective tap for each of the elements;
from the respective tap for each element of the elements, adjusting the amplitude and the phase selected for the radiofrequency signal coupled to the feedline for the element;
coupling the radiofrequency signal of each element of the elements from the feedline of the element into the driven and parasitic patches of the element via the via through the first dielectric; and
transmitting the electromagnetic radiation from the driven and parasitic patches of the elements toward the direction of the antenna beam;

and during the receive mode:
   receiving the electromagnetic radiation at the driven and parasitic patches of the elements;
   coupling the electromagnetic radiation from the driven and parasitic patches of each element of the elements into the radiofrequency signal coupled to the feedline of the element via the via through the first dielectric;
   at the respective tap for each element of the elements, adjusting the amplitude and the phase selected for the radiofrequency signal of the element; and
   combining the respective taps for the elements into the aggregate radiofrequency signal at the radiofrequency interface, wherein the aggregate radiofrequency signal represents the electromagnetic radiation received from the direction of the antenna beam.

* * * * *